United States Patent [19]

Johnston, Jr. et al.

[11] 4,268,800

[45] May 19, 1981

[54] VERTEX-MOUNTED TIPPING BREWSTER PLATE FOR A RING LASER

[75] Inventors: Thomas F. Johnston, Jr., Sunnyvale; William P. Proffitt, San Jose, both of Calif.

[73] Assignee: Coherent, Inc., Palo Alto, Calif.

[21] Appl. No.: 34,511

[22] Filed: Apr. 30, 1979

Related U.S. Application Data

[63] Continuation-in-part of Ser. No. 16,688, Mar. 2, 1979.

[51] Int. Cl.³ .............................................. H01S 3/08
[52] U.S. Cl. ............................................... 331/94.5 C
[58] Field of Search .................. 356/350; 331/94.5 C, 331/94.5 L

[56] References Cited

PUBLICATIONS

Schuda et al., Direct Optical Measurement of Sodium Hyperfine Structure using a CW Dye Laser and an Atomic Beam, Appl. Phys. Lett., vol. 22, (Apr. 15, 1973), pp. 360–362.

*Primary Examiner*—William L. Sikes
*Attorney, Agent, or Firm*—Limbach, Limbach & Sutton

[57] ABSTRACT

A tipping Brewster plate, used for fine tuning a tunable ring laser, such as a dye laser, is located close to a flat mirror comprising one of the optical elements of the ring optical resonator, so that both the incident and reflected beam from the flat mirror pass through the tipping Brewster plate. When the ring laser is tuned by tipping the Brewster plate, no lateral displacement of the ring laser beam takes place.

6 Claims, 5 Drawing Figures

VERTEX-MOUNTED TIPPING BREWSTER PLATE FOR A RING LASER

Related Application

This is a continuation-in-part of U.S. patent application Ser. No. 16,688, filed Mar. 2, 1979, entitled "Vertex-Mounted Tipping Brewster Plate for a Ring Laser".

BACKGROUND OF THE INVENTION

The present invention relates to tunable ring lasers and more particularly to an improved way of tuning a ring laser, such as a dye laser.

Tipping an inserted glass plate about a small range of angles near Brewster's angle has become a standard means to change the length of optical path in a single-frequency dye laser cavity to produce a frequency scan. For a −2° to +2° tip range away from Brewster's angle of incidence (55.6° for a silica plate) the Fresnel equation gives less than 0.1% maximum reflection loss, which is acceptable for an intracavity element in a dye laser, and a 30 μm path length change for a silica plate 1 mm thick. This path length change is enough for a scan of 100-cavity mode spacings for a laser operating at 600 μm wavelength. Not only is this a long scan, but the scan is very linear with tip angle. The first use of this technique to scan a dye laser was made by Schuda, Hercher and Stroud, Appl. Phys. Lett. 22, Vol. 22, Apr. 15, 1973, pp. 360-362.

An alternative method of changing the cavity path length is to mount an end mirror on a piezoelectric element and drive this assembly with a high voltage ramp. This technique is typically limited to one-tenth the range afforded by a tipping Brewster plate and has five times the non-linearity.

Traveling-wave CW ring dye lasers are capable of several-watt single-frequency outputs because they may be pumped with the full power of available ion lasers. In contrast, an input power limit exists in a standing-wave dye laser due to the regions of unsaturated gain in the pumped volume of the dye jet at the nodes of the standing wave. It has been shown that the fraction of the total volume that the unused portion represents, decreases as the dye beam intensity increases. The drop in volume, however is less rapid than the linear rise in pump power. Thus, a mode at a second frequency, which has antinodes where the first mode has nodes, must eventually reach threshold and oscillate as the pump level is increased in the standing wave case. This limit does not exist in a ring laser, and typically a ring can be pumped four times harder than a standing wave laser.

The ring laser cavity typically employs a four-mirror, figure-eight configuration to keep the fold angles small, allowing astigmatic compensation with a Brewster plate of reasonable thickness. But in a ring laser, a conventional tipping Brewster plate has a major disadvantage in that the lateral beam displacement which accompanies the path length change misaligns the optical resonator ring, and produces an unacceptable power modulation of the dye laser over the frequency scan. For a 30 μm path length change for the tipping Brewster plate, the lateral beam displacement is 50 μm. The spot size of the beam in the dye cavity is 500 μm, and the optical loss produced by this displacement may be as large as 10%.

In a conventional three-mirror "linear cavity" dye cavity, the beam also experiences lateral displacement but since it is incident only on a flat mirror, the beam returns upon itself. Thus, the displacement of the return beam is "undone" in the second traversal of the tipping plate, and there is no displacement of the beam at the curved mirrors or the jet.

SUMMARY OF THE INVENTION

It is therefore an object of the invention to provide an improved means for tuning a ring laser.

Another object of the invention is to provide means for utilizing a tipping Brewster plate in a tunable ring laser such as a dye laser without introducing lateral displacement of the ring laser beam.

Another object of the invention is to provide a tipping Brewster plate within a ring laser for tuning a ring laser without producing unacceptable power modulation of the laser beam over the frequency scan of the tipping Brewster plate.

In accordance with the present invention, a tipping Brewster plate is mounted near a mirror within the ring laser optical resonator cavity. The tipping Brewster plate is sufficiently close to the vertex formed by the reflected of the incident beam and the reflected beam off of the flat mirror that both the incident and the reflected beams traverse through the tipping Brewster plate. Then, for a small angular range of Brewster plate "tip", and a small vertex angle, lateral displacement of the incident and reflected beams passing through the Brewster tipping plate cancel and there is virtually no net displacement of the beams within the ring laser cavity or at the jet stream, in the case of a dye laser. In other words, the result is the same as for the use of a tipping Brewster plate in a linear dye laser.

The present invention is superior to other alternatives for solving the problem of lateral displacement. One alternative is the use of two identical Brewster tipping plate assemblies within the ring resonator cavity arranged electrically so that the plate of one of the tipping plate assemblies tips the same amount, but in the opposite sense of the first assembly.

However, the subject invention has several significant advantages over this approach. The first is that a single tipping Brewster plate is only half as costly as a double Brewster plate assembly. Secondly, because the beam traverses the vertex mounted plate twice, twice the path length changes are produced for a given plate thickness and angular change as compared to the alternative approach. This allows a thinner plate to be used, producing a higher mechanical resonant frequency for the tipping Brewster plate assembly, which is helpful in the design of the servo used for rotating the tipping Brewster plate.

DESCRIPTION OF THE PREFERRED EMBODIMENT

Figure 1A:
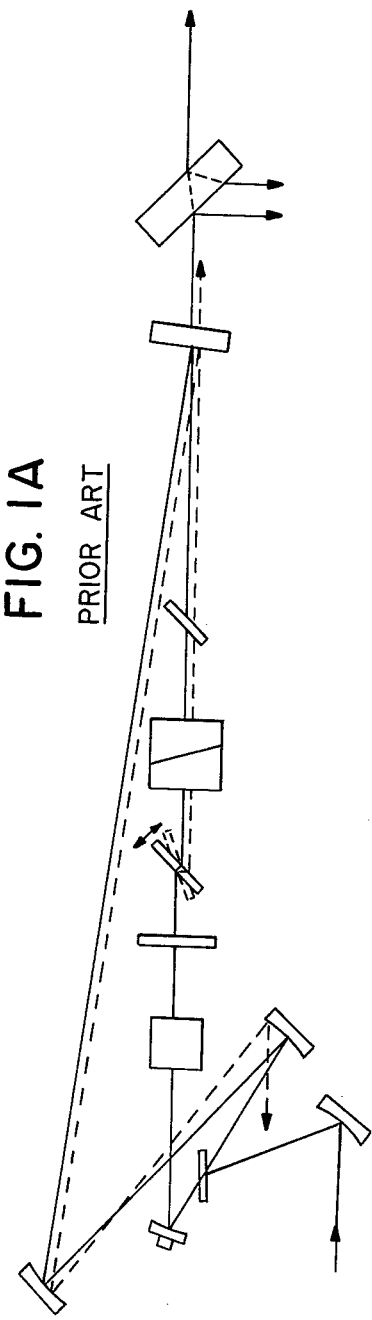
FIG. 1A is an optical schematic diagram of a ring dye laser having a conventionally mounted tipping Brewster plate.

The optical schematic of a typical ring dye laser 10 is shown in FIG. 1A. The optical cavity comprises four mirrors 12, 14, 16 and 18 forming a figure-eight configuration. The purpose of the figure-eight configuration is to keep the fold angles small, allowing astigmatic compensation of concave mirrors 14, 16 and 18. The three mirrors 14, 16 and 18 are all of high reflectivity while mirror 12 is the output coupler allowing some of the ring dye laser light to pass through it.

The two concave mirrors 14 and 16 focus the dye laser beam to a narrow waist, at which point, an unsupported liquid dye stream 20 is injected in the well-known manner, into the ring laser path. The liquid dye is the active lasing material in the laser. The dye stream 20 is optically pumped by another laser (not shown) such as a continuous wave argon ion laser. Its output beam 22 is directed at a pump mirror 24 to intersect the dye stream 20.

Reflecting mirrors 16 and 18 are concave to provide an auxiliary focus point or "waist" 26 within the dye laser cavity. Auxiliary waist 26 can be used to mount intercavity experiments, such as frequency doubling in a non-linear crystal to produce suitable ultra-violet radiation.

Unidirectional lightwave propagation is provided by optical diode 28. One such optical diode is described in co-pending patent application Ser. No. 16,687, by the same inventors, entitled "Broadband Optical Diode for a Ring Laser", assigned to the same assignee as the present invention.

There are several optical tuning elements within the ring dye laser optical cavity 10, in addition to a tipping Brewster plate 30, whose function has been described previously. Coarse tuning of the dye laser is done by a birefringent filter 32. Such as filter is described in U.S. Pat. No. 3,868,592 entitled "Improved Tuning Apparatus for a Dye Laser".

Additional dye beam frequency control elements include a thick etalon 34, a thin etalon 36, and a piezoelectric drive 38 for fold mirror 14. Thick etalon 34 is described in U.S. Pat. Nos. 4,081,760 and 4,097,818. These three optical elements, as well as the tipping Brewster plate 30, are controlled to selectively tune the dye laser to a predetermined output frequency and to maintain that output frequency despite momentary perturbations of laser operation. Such a control system is described in U.S. Patent Application Ser. No. 812,698 entitled "Method and Apparatus for Automatically Reacquiring a Predetermined Output Radiation in a Tunable Laser", assigned to the same assignee as the present invention, and in U.S. Pat. No. 4,092,530 entitled "Feedback Loop Control System Employing Method and Apparatus for Stabilizing Total Loop Gain and Bandwidth". A beam splitter 40, positioned outside of the ring laser cavity 10, provides a pair of low intensity light beams 42 and 44 which are utilized in the described control system.

Figure 1B:
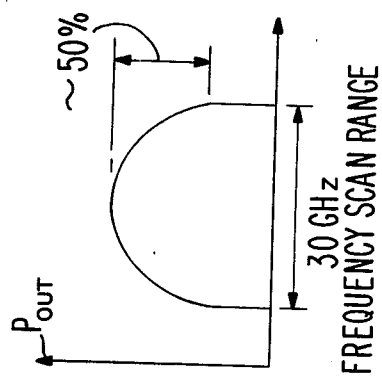
FIG. 1B is a graph showing the output power of the ring laser of FIG. 1A as a function of the frequency scan resulting from "tipping" of the tipping Brewster plate.

The effect of "tipping" the tipping Brewster plate 30 to scan the ring laser output frequency is shown in FIGS. 1A and 1B. With the tipping Brewster plate 30 in the position shown by the solid lines, the output frequency of dye laser 10 is in the middle of the possible scanning range with the tipping Brewster plate. This is indicated by $f_o$ in FIG. 1B. Note that in this position the laser beam 46 (shown as a solid line) reflected within the ring optical resonator cavity is colinear with the optical axis of the cavity. The output power, $P_{max}$, is at a maximum.

However, when the Brewster plate 30 is tipped, i.e. rotated about its axis, the laser beam 46 is laterally displaced within the optical cavity (shown as dashed lines) for the reasons explained previously. This is indicated in FIG. 1A where the Brewster plate 30 is "tipped" to the position 30' indicated by dashed lines. If the Brewster plate is tipped to the limit of its scan capability, i.e. to frequency $f_1$ in FIG. 1B, the resulting misalignment of the laser beam results in a 50% loss in power, as indicated by the lower power level $P_{min}$.

Figure 2A:
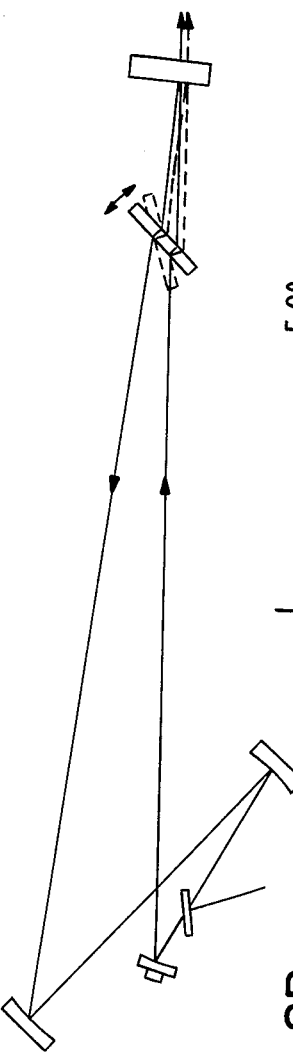
FIG. 2A is a partial optical schematic diagram of a ring dye laser with the tipping Brewster plate located near the vertex of the incident and reflected beam off of a flat mirror forming one of the elements of the ring optical resonator.

FIG. 2A shows the ring laser of FIG. 1A with the tipping Brewster plate 30 located near the vertex 48 of the reflected laser beam 46 off mirror 12. Note that both the incident and reflected beam off mirror 12 pass through the Brewster plate 30.

Figure 2B:
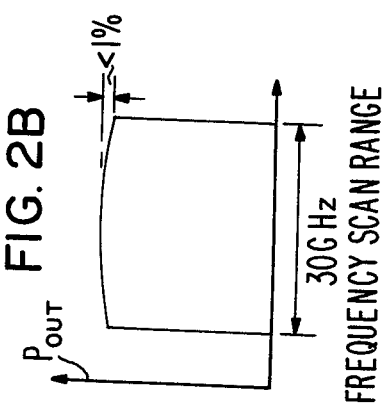
FIG. 2B is a graph showing the output power of the ring laser of FIG. 2A as a function of the frequency scan resulting from "tipping" of the tipping Brewster plate.

As shown in FIG. 2B in the configuration of FIG. 2B there is very little loss as the tipping Brewster plate is "tipped" over its frequency scan range. Over a scan range of 30 GHz, there is a power loss of less than 1%. This should be compared with the 50% power loss shown in FIG. 1B for a ring laser with a conventional tipping Brewster plate arrangement.

It can be seen by reference to FIG. 2A that as the tipping Brewster plate 30 is tipped there is a displacement of the incident laser beam passing through it. This is illustrated by the dashed lines. However, it can also be seem that after the laser beam has reflected off of the mirror 48, it is displaced back approximately the same amount as it passes back through the tipping Brewster plate 30. Thus, there is virtually no net lateral displacement of the laser. This produces the very flat power response as shown in FIG. 2B. This holds true for small angular range of tip of plate 30, and small vertex angles.

Since the tipping Brewster plate 30 cannot be precisely at Brewster's angle for both the incident and reflected beams the reflection losses off the plate 30 are slightly increased compared with a linear cavity laser. However, this increased loss is negligible.

Figure 3:
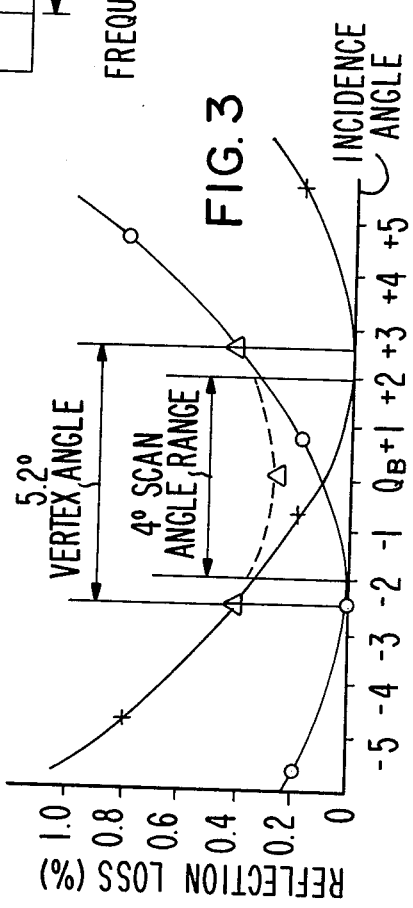
FIG. 3 is a graph showing the amount of reflection loss from the tipping Brewster plate for both the incident and reflected beam as it passes through the tipping Brewster plate, as a function of the vertex angle, and as a function of the amount of rotation of a tipping Brewster plate, in the embodiment of FIG. 2B.

FIG. 3 is a plot of reflection losses as a function of tip angle of the Brewster plate 30. Curve 50 shows reflection losses in the incident beam passing through the plate 30 and curve 52 is the reflection loss for the reflected beam passing through plate 30. Curve 54 is the sum of the losses, for the tipping angle range, of curves 50 and 52.

As shown in FIG. 3, in the present mounting of the Brewster plate, the reflection loss goes only to about 0.3% (from the 0.1% of linear cavity) a change which introduces only a 2% power insertion loss for the mid-scan angular position, with a 15% output coupler 12. The reflection loss increases to about 0.4%, so that the power loss increases to 2.7%, at the extremes of a 30GH$_z$ scan, so the power modulation over the scan is only 0.7%, which is quite acceptable, and is a major advantage of the present invention.

Tipping Brewster plate 30 typically is made of high optical quality, fused silica. The sides of plate 30 must be parallel. Since the tipping Brewster plate 30 is "tipped" quite rapidly by the servo control system, it should be as small as possible. Since it is a requirement of the present invention that both the incident and reflected light pass through it, this means that the Brewster plate should be as close as possible to the vertex of the beam, and also, the vertex angle should be as small as possible.

While the invention has been described in the embodiment of a dye laser, it should be understood that the invention is applicable to any tunable ring laser.

What is claimed is:

1. In a ring laser having an optical resonator for providing unidirectionally propagating optical energy which includes at least one flat mirror, and having means for adjusting the length of the optical resonator for fine tuning the ring laser which includes a thin optically transmissive tuning plate nominally at Brewster's angle to the optical path and rotatable about a small tip angle from Brewster's angle; and wherein the improvement comprises:

means for mounting said tipping plate near the flat mirror such that both the incident and reflective beam pass through said tipping plate.

2. A ring laser as in claim 1 wherein said tipping plate is mounted sufficiently close to said flat mirror, that the angle of the incident beam and reflected beam are at an angle sufficiently close to Brewster's angle as they pass through the tipping plate that optical losses are within acceptable limits.

3. A ring laser as in claim 1 including means for mounting said flat mirror within the optical cavity such that the angle of incidence and reflection is close to normal to the mirror surface.

4. In a ring laser having at least one mirror forming a part of the optical resonator and including a tipping Brewster plate for use as a path-length changing element in a ring laser cavity which avoids cavity misalignment comprising means for mounting the tipping Brewster plate to intercept both the incident and reflected beams at a mirror vertex, so that the lateral offset of the first traversal of the plate is compensated by the offset at the second traversal of the plate.

5. A ring laser as in claim 4 wherein the mirror is plane.

6. A ring laser as in claim 5 or 4 wherein the tipping plate in the ring cavity rotates through a small angular range approximately equal to the vertex angle so that the total reflection losses of the sum for both beams is approximately a constant for all tip angles.

* * * * *

UNITED STATES PATENT AND TRADEMARK OFFICE
CERTIFICATE OF CORRECTION

PATENT NO. : 4,268,800

DATED : May 19, 1981

INVENTOR(S) : JOHNSTON, JR., ET AL.

It is certified that error appears in the above-identified patent and that said Letters Patent are hereby corrected as shown below:

Column 3, line 48, delete "such as" and add --such a--.

Signed and Sealed this

Twenty-fourth Day of November 1981

[SEAL]

Attest:

GERALD J. MOSSINGHOFF

Attesting Officer     Commissioner of Patents and Trademarks